Figure 1:
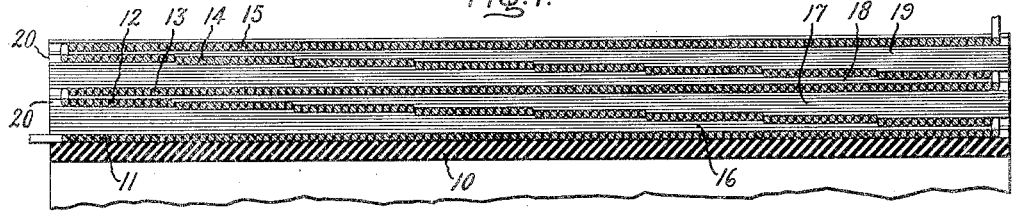

Aug. 31, 1943.  L. W. FOSTER  2,328,443
MULTILAYER ELECTRICAL WINDING AND METHOD AND
APPARATUS FOR MAKING SAME
Filed Feb. 18, 1941  2 Sheets-Sheet 1

Inventor:
Levin W. Foster,
by Harry E. Dunham
His Attorney.

Aug. 31, 1943.                L. W. FOSTER                 2,328,443
            MULTILAYER ELECTRICAL WINDING AND METHOD AND
                     APPARATUS FOR MAKING SAME
                       Filed Feb. 18, 1941              2 Sheets-Sheet 2
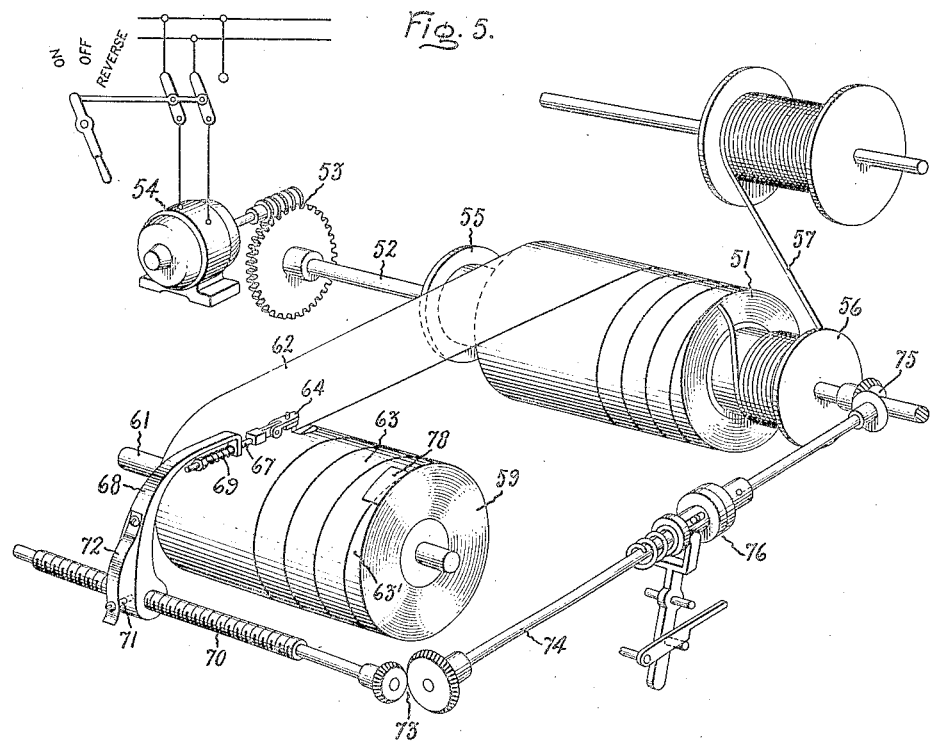
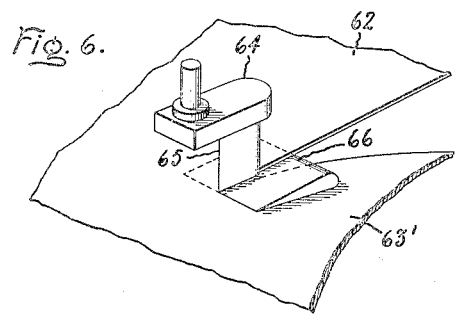
Inventor:
Levin W. Foster,
by Harry E. Dunham
His Attorney.

Patented Aug. 31, 1943

2,328,443

UNITED STATES PATENT OFFICE 2,328,443

MULTILAYER ELECTRICAL WINDING AND METHOD AND APPARATUS FOR MAKING SAME

Levin W. Foster, Pittsfield, Mass., assignor to General Electric Company, a corporation of New York Application February 18, 1941, Serial No. 379,533

18 Claims. (Cl. 242—10)

The present invention relates to multilayer electrical windings and to methods and apparatus for making such windings.

Electrical windings frequently comprise a plurality of concentric layers of conductor turns connected in series by connections between adjacent ends and separated by intervening layers of insulation. In this type of winding a relatively small potential difference occurs between the ends of adjacent layers which are connected together, while a maximum potential difference occurs between the other ends which are not connected. It is a common practice in the manufacture of such windings to form the interlayer insulation from a rectangular sheet or web of insulating material of a width equal to that of the winding and which is wrapped onto the winding to a total thickness as determined by the maximum difference of potential occurring between conductor layers. It follows that the insulation which is thus provided between the ends of the two adjacent layers which are connected together and hence at a low potential difference is greatly in excess of the insulation requirements at such points.

It will be apparent that a considerable saving may be effected in the use of insulating material if the interlayer insulation were so tapered in thickness as to more closely approximate the actual need therefor across the winding. The advantages that may be realized through such insulating procedure are not limited to a more economical use of insulating material but the greatly improved space factor of the winding makes possible still further economies and increased efficiencies in other parts of the apparatus in which the winding is incorporated. While the principles of this type of insulation, and the advantages to be derived therefrom, have been recognized heretofore, no practicable application of such principles to multilayer electrical windings is known to have been made with a full realization of the advantages without introducing other serious counter-affecting disadvantages.

It is therefore an object of the present invention to provide a new and improved multilayer electrical winding having layers of insulation between adjacent conductor layers of a gradually varying thickness approximating generally the actual insulation requirements as determined by the potential difference occurring between adjacent turns of two adjacent conductor layers.

It is a further object of the invention to provide a new and improved method for making a multilayer electrical winding having insulation layers between adjacent conductor layers which is graduated in thickness along the length of the winding generally in accordance with the potential difference occurring between various points of adjacent conductor layers.

It is a still further object of the invention to provide new and improved apparatus for making multilayer electrical windings of the type to which reference is made.

For a further understanding and a more complete description of the invention, attention is directed to the following description taken in connection with the accompanying drawings while the features of novelty will be pointed out with greater particularity in the appended claims.

Figure 2:
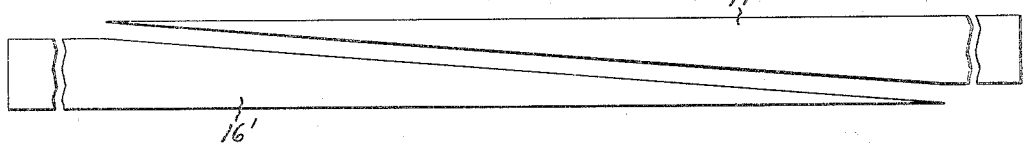
Figure 3:
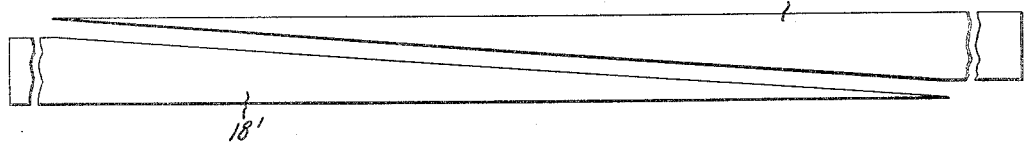
Figure 4:
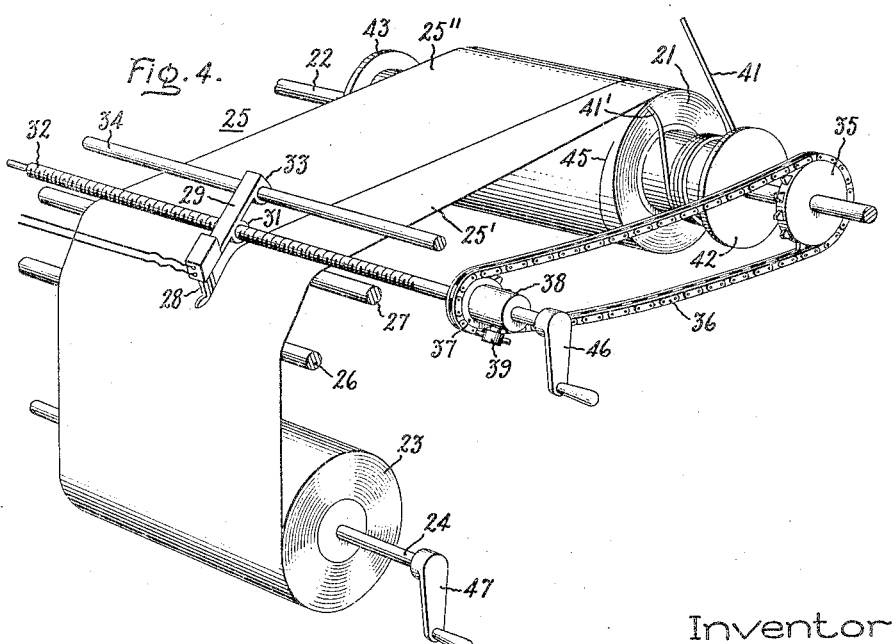

In the drawings, Fig. 1 is a longitudinal cross-sectional view through one side of a portion of a winding constructed in accordance with the present invention; Figs. 2 and 3 are developmental views to a reduced scale of strips of insulating material forming the interlayer insulation of the winding portion shown in Fig. 1; Figs. 4 and 5 are views in perspective of two modifications of apparatus of my invention for making an electrical winding as is illustrated in Fig. 1; and Fig. 6 is an enlarged view illustrating one detail of the apparatus shown in Fig. 5.

Referring now to the drawings, in Fig. 1 is shown a portion of an electrical winding in cross-section comprising a supporting cylinder or form 10 of a suitable insulating material having wound thereon a plurality of coaxial conductor layers indicated at 11 to 15, inclusive, separated by layers of insulation indicated at 16 to 19, inclusive, respectively. As viewed in Fig. 1, the lowermost conductor layer 11 is wound directly upon the cylinder 10 from left to right, the second layer from right to left and so on, each successive layer doubling back over the next lower layer. The interlayer insulation is of a graduated thickness, being thin between the ends of adjacent layers which are connected together where the potential difference therebetween is low, and thick at the opposite ends where the potential difference between the two adjacent conductor layers is maximum. The insulation layers are each formed by a plurality of turns of a tapered strip of suitable insulating material, such as paper. The various layers of insulation 16 to 19, inclusive, are shown in a developed form to a reduced scale in Figs. 2 and 3, the first two layers of insulation 16 and 17 being shown in Fig. 2 at 16' and 17', respectively, and the second two layers 18 and 19 in Fig. 3 at 18' and 19', respectively. The pieces for each pair of insulation layers are formed from a single rectangular section of insulating material by cutting diagonally thereacross forming two similar complementary tapered strips. The length of each section and the angle of cut are determined by the diameter of the winding at the point to which the insulation layer is to be applied, the maximum thickness required for the insulation layer, and the thickness of the web of insulating material. As will be presently described, the cutting operation may be performed simultaneously with the wrapping of one layer of insulation onto the winding.

While in Fig. 1, the first flat conductor layer is shown wound directly upon the cylinder 10, it is obvious that if the cylinder does not have a sufficient initial thickness, a number of turns of full width insulation may be first wrapped thereon before the first conductor layer is applied. After the conductor layer 11 has been wrapped onto the cylinder, the wide end of the tapered strip 16' is secured to the outer surface of the conductor layer and is wrapped thereupon, keeping the straight edge of the strip square with the left end of the winding. It will generally be preferred that the untapered end of the strip be sufficiently long that at least one turn of full width may be wrapped around the conductor layer before the taper of the insulation layer begins. It will be evident that as the strip 16' is wound onto the conductor layer it will form an insulation layer having a graduated thickness as is indicated at 16 in Fig. 1. With the end tip of the strip 16' anchored in place, the second conductor layer 12 is then applied from right to left, and the second insulation layer 17 is then wrapped thereupon. The pointed end of the insulation strip 17' is then anchored onto the right edge of the winding, or to the end of narrowest diameter. With the straight edge of the strip held square with the right end of the winding, the strip is then wound over the conductor layer 12 finishing with at least one turn of full width. It will be observed that inasmuch as the taper of the strip 17' is identical with the taper of the strip 16', the layer 17 will build up as its width increases at the same rate as the diameter of the winding layer increases. This of course is not strictly true because the mean diameter of the insulation layer 17 will be greater than the mean diameter of the layer 16 by an amount equal to twice the thickness of the conductor layer. The turns of insulation, and hence the outer surface of the insulation layer 17, will lie in substantially cylindrical surfaces parallel with the axis of the winding so that the third conductor layer 13 will be substantially cylindrical, or flat, and concentric with the first layer 11. The intervening conductor layer will be of a generally conical shape, having a taper determined by the space between the first and third conductor layers.

The insulation strips for the third and fourth insulation layers must be cut at a longer taper than the strips for the first two insulation layers by reason of the fact that the diameter of the winding has been considerably increased by the telescoped insulation layers 16 and 17, the intervening conductor layer 12, and also the added conductor layer 13. The correct taper can be readily calculated, though with the apparatus to be presently described, the correct taper is automatically obtained for each pair of successive insulation layers once the apparatus has been adjusted for cutting the strips for the first pair of insulation layers. The strips for the insulation layers 18 and 19 are illustrated in a developed form in Fig. 3 at 18' and 19', respectively. These may be applied to the winding alternately with additional conductor layers in a manner as described above.

After each conductor layer has been wound in place, the conductor extending from the supply roll may be severed and the end turn temporarily anchored to the winding while the next succeeding insulation layer is applied. After the insulation layer has been applied, the conductor ends may be welded or brazed together, and the conductor brought through a notch indicated at 20 in the edge of the insulation layer and the next layer of conductor turns wrapped onto the winding.

While in Fig. 1 is shown a winding comprising only five conductor layers separated by intervening layers of tapered insulation, it will be obvious that a winding may be built up in the manner described to any desired number of conductor layers.

In Fig. 4 is illustrated one form of apparatus by which a winding such as described above may be manufactured quickly and accurately. In this figure, 21 is a partially completed winding and it may be assumed that it is similar to the winding portion shown in Fig. 1 after the completion of the third conductor layer 13 and at the start of the next insulation layer 18. The winding portion 21 is mounted upon a suitable mandrel which in turn is supported upon the rotatable shaft 22 of a suitable power driven winding machine or lathe. A roll of insulating material 23, such, for example, as paper, is mounted upon a suitably supported rotatable shaft 24 in a laterally spaced relation with respect to the winding mandrel. A web 25 from the roll 23 passes over the rods or rollers 26 and 27 to the winding. As shown the end of the web 25 has been suitably secured onto the last preceding conductor layer of the winding and a relatively few turns of full width insulation have been wrapped onto the winding.

For cutting diagonally across a section of the web as it is fed onto the winding, a suitable cutting device is provided, such as the electric shear 28 which in turn is mounted upon the traveling support 29. The support 29 includes the nut 31 cooperatively threaded upon the screw 32 and a bushing 33 slidably fitted onto the guide rod 34 which is fixed parallel with the screw 32 both being parallel with the shaft 22. The screw 32 is coupled to the winding machine in a manner so that it is driven at a rate proportional to the rate of rotation of the winding. As illustrated, this coupling may be effected through means including a sprocket 35 secured to the lathe or winding machine shaft 22, chain 36, and sprocket 37 provided on the end of the screw 32. The sprocket 37 is fixed to the end of the sleeve 38 which in turn may be made fast to the screw 32 as by means of the nut 39.

The conductor for the winding may be supplied from a suitably mounted reel (not shown), the conductor extending therefrom being indicated at 41. At the completion of each conductor layer the conductor may be severed and the end turn of the layer anchored to the winding temporarily while the next layer of insulation is applied, as described above. It is preferred, however, that the conductor be not severed at the end of each layer since to do so necessitates a welding of the ends together again at the start of the next conductor layer. In the apparatus shown, provision is made for making a winding in which the continuity of the conductor is maintained throughout the manufacture of the winding. At the opposite ends of the winding there are provided relatively short dummy drums which may be merely extensions of the winding mandrel and which are provided with end flanges indicated at 42 and 43, respectively. The end turn of the last conductor layer is brought out from the end of the winding as indicated at 41' and the conductor is wrapped around the dummy drum as the winding is rotated for the application of the superimposed layer of insulation. Since the total number of turns of insulating material making up each layer is relatively small, the number of conductor turns wrapped upon the dummy drums is relatively small and after the layer of insulation has been completed and anchored firmly in position, the winding machine may be reversed and the conductor turns thus wound on the dummy drums may be transferred back onto the supply reel. The winding machine may then be rotated in the forward direction again to wrap the next conductor layer over the last applied layer of insulation without having severed the conductor.

After a cylindrical or flat conductor layer, such as the layer 13, has been completed the end of the web of insulating material 25 is suitably anchored to the partially formed winding and one or more turns of the full width web are wound thereon. The web is then slit with a sharp edged tool adjacent one edge but spaced slightly therefrom as indicated at 45, and the shearing blade of the cutting device 28 is inserted therethrough. The cutting device may be shifted to such starting position by means of the hand crank 46 provided on the end of the screw 32. With the blade of the cutter inserted through the slit 45, the nut 39 on sprocket sleeve 38 is tightened so that with further rotation of the winding machine shaft 22, the screw 32 will be driven to cause the cutting device 28 to move transversely across the web 25 simultaneously with the winding of the latter upon the form, cutting a section of the web diagonally into two tapered pieces 25' and 25". The relative dimensions of the chain sprockets 35 and 37 are so selected that the cutting device 28 will be driven laterally across the web 25 with a predetermined number of revolutions of the winding 21 as determined by the total number of turns and hence the maximum thickness of insulating material to be wound into one insulating layer. Since the maximum thickness for each layer of insulation will be substantially the same throughout the winding, this selection of the proper sized sprockets need be made only once, that is, at the beginning of the winding. Thereafter as the diameter of the winding increases, and the circumferential length of the insulation layer is correspondingly increased, proper correction of the angle of cut is automatically made, since the cutting device 28 is moved across the web at a predetermined distance per revolution of the winding.

As previously explained, the two adjacent and oppositely tapered layers of insulation between each pair of cylindrical conductor layers have approximately the same mean diameter and the strips for such two layers of insulation properly may be cut simultaneously. With the apparatus shown in Fig. 4 the entire web section including the two diagonally cut pieces is wound upon the winding, the piece 25' following the piece 25" by virtue of the fact that the slit 45 was made a slight distance inwardly from the edge of the web. After the cutting device 28 has been moved all the way across the web 25, the pointed end of the insulation piece 25" is anchored to the winding. The nut 39 holding the driving sprocket 37 fast to the screw 32 is loosened and the winding machine is reversed. The second tapered portion 25' of the web is then wound back upon the roll 23 which, for example, may be rotated by the hand crank 47 provided for that purpose. Simultaneously the conductor will be unwound from the dummy drum at the right end of the winding and may be wound back upon the supply reel. At the end of the tapered piece 25' the insulating material may be cut or torn across the slight distance from the slit 45 to the edge. The insulation piece 25" will be left upon the winding and will form a layer of tapered thickness similar to the insulation layers 16 and 18 of Fig. 1. The thin end of the insulation layer last applied may then be notched, the conductor 41' brought therethrough, and the next conductor layer then wrapped upon the winding which layer will be conical resembling the layers 12 and 14. At the termination of the next conductor layer at the left end of the winding the pointed or narrow end of the tapered piece which has been wound back upon the roll 23 may be secured onto the right end of the winding and wound thereon. After the desired number of insulation turns have been applied, presumably the same number as provided in the first insulation layer, the web may be severed at right angles and the end of the insulation layer anchored in place. In the meantime, the conductor 41 will be wound upon the dummy drum at the left end of the winding for the number of turns corresponding to the number of turns of insulation. After the second insulation layer has been completed, the conductor may be unwound from the dummy drum and other conductor layers applied alternately with insulation layers, as described, to form a winding of the desired size.

In the operation of the winding making machine just described, both of the diagonally cut portions formed from a section of a web of insulating material are wrapped upon the winding, the uppermost of which portions is subsequently unwound and wrapped back upon the roll of insulating material while the next succeeding conductor layer is wrapped onto the winding. It will be obvious, however, that the second insulation piece 25' may, if desired, be wrapped upon a separate roller suitably arranged between the cutting device and the winding. By a suitable arrangement of a cutter adjacent the surface of the roll of insulating material 23, it is possible to cut a first tapered portion of insulating material which is to be wrapped upon the winding leaving the second portion upon the roll itself. Such a further modification of apparatus according to the invention is illustrated in Fig. 5.

Referring to Fig. 5, a winding portion 51, similar to the portion 21 described above, is mounted upon a suitable mandrel which in turn is supported upon the rotatable shaft 52 of a suitable winding machine or lathe adapted to be driven through gearing 53 by any suitable prime mover such as the reversible motor 54. The opposite ends of the winding mandrel are provided with dummy drums indicated at 55 and 56 for receiving the conductor 57, while the layers of insulation are wrapped onto the winding. A supply roll 59 of insulating material is mounted upon a suitable shaft 61 laterally of the winding. As shown, a portion of an insulation layer has been formed over a cylindrical or flat layer of conductor turns on the winding by a diagonally cut portion 62 of a web of insulating material from roll 59. The remaining complementary diagonally cut portion 63 of the web has been left upon the roll 59. A cutter 64 comprising a knife edge 65 and a wedge shaped shoe 66 rigidly attached to the lower end thereof is pivotally mounted upon the end of a bolt 67 which in turn is mounted upon the end of a bracket 68. The bolt 67 extends through an opening in the depending end of the bracket and is provided on its outer end with a biasing compression spring 69. The lower end of the bracket 68 is slidably mounted upon the screw 70 and is provided with a thread follower 71 normally biased into engagement with the threads of the screw 69 by a spring 72 whereby upon rotation of the screw, the bracket, and hence the cutter 64, are caused to move transversely of the roll 59. The screw 70 is parallel with the shaft 61. The screw 70 is coupled by gearing 73, shaft 74, and gearing 75 with the shaft 52 of the winding machine. A suitable clutch 76 is arranged in the shaft 74 whereby the screw 70 may be disconnected from the shaft 52. It will be obvious that the gearing and clutched shaft drive for the cutter driving screw 70 is merely an alternative arrangement for the corresponding chain drive described in connection with the preceding modification. The proper angle of cut across the web is determined for the first insulation layer of the winding and a corresponding selection made in the gear ratios of the driving connection. Thereafter, as the winding diameter increases proper compensation is automatically made in the cutting angle for successive pairs of insulation layers.

In the operation of this apparatus, after a first cylindrical or flat conductor layer has been completed, the end of the web of insulating material from the roll 59 is suitably anchored onto the conductor layer and the desired number of full width turns are then wrapped thereon. With the cutter bracket 68 in an operative position at the right end of roll 59 and the thread follower 71 in engagement with the screw 70, the left end of the cutter wedge shoe 66 is slid into the V between the web and the roll. The clutch 76 is then engaged and the winding rotated through a partial turn causing the cutter to slit a short distance into the web. The tip 63' is then slid under the right end of the cutter shoe 65, as illustrated in Fig. 6, and anchored to the roll as by means of an adhesive patch 78. By virtue of the biasing spring 69 provided on the outer end of the cutter supporting bolt 67, the wedge shaped shoe 66 will be held snugly in the V between the web leaving the roll 59 and the roll itself. Rotation of the winding is then continued and the diagonally cut portion 62 of a web section may then be wound directly upon the conductor layer of the winding while the second diagonally cut portion 63 will be left upon the roll 59. After the next succeeding conductor layer has been wrapped onto the winding, then the patch 78 may be removed, the end 63' of the insulation strip 63 may be suitably anchored to the right edge of the conductor layer and wrapped thereupon in a manner as previously described.

The layers of insulation cut and applied to the multilayer winding in the manner described will fit smoothly thereupon without buckling between the conductor layers. Air pockets and irregularities in the surfaces of the layers within the winding are thus avoided. There will be no waste of insulating material in cutting the tapered strips for each layer and little additional time is required for completing a winding of the type herein described over that required for making a similar sized winding according to the usual practice with the use of rectangular insulating sheets. Considerable economies result from the manufacture of windings in accordance with the invention not only in the actual amount of insulating material used but, by reason of the greatly improved space factor of the completed winding, also in the design of the other parts of apparatus in which the winding is to be used.

Having described my invention in what I consider to represent preferred embodiments thereof, I desire to have it understood that the specific details, of the winding itself, the method, and the apparatus, are merely illustrative and that the invention may be carried out in other ways.

What I claim as new and desire to secure by Letters Patent of the United States is:

1. Apparatus for making an electrical winding comprising means for rotatably supporting a winding form, means for holding a longitudinal web of insulating material in a position for wrapping onto said form, and means for cutting diagonally across a section of said web as a portion of said section is wound onto said form.

2. Apparatus for making an electrical winding comprising means for rotatably supporting a winding form, means for holding a longitudinal web of insulating material in lateral alignment with said form, and means for cutting longitudinally of said web at an angle with respect to an edge thereof as a portion of said web is wound upon said form.

3. Apparatus for making a multilayer electrical winding having layers of insulation of graduated thickness between conductor layers, said apparatus comprising a rotatable winding support, means for holding a roll of insulating material laterally of said support, and means for cutting lengthwise of a section of said web of insulating material from said roll at an angle with respect to the edges thereof as a portion of said web section is wrapped onto a winding being formed on said support.

4. Apparatus for making a form wound electrical winding comprising a plurality of conductor layers having layers of insulation of gradually varying thickness therebetween, said apparatus comprising a rotatable support for a winding form, means for holding a roll of insulating material in a position to be wrapped onto said form, means for cutting longitudinally of a web of said roll of insulating material, and means for moving said cutting means transversely of said web as a portion thereof is wrapped onto said form.

5. Apparatus for making an electrical winding comprising means for rotatably supporting a winding form, means for supporting a longitudinal web of insulating material, means for cutting diagonally across a section of said web as it is wound upon said form, and means for moving said cutting means transversely of said web at a predetermined rate depending upon the rate at which insulating material of said web is fed onto said form.

6. Apparatus for making an insulated form wound coil, said apparatus comprising a form, a rotatable support for said form, means for holding a longitudinal web of insulating material having a width substantially equal to the width of said coil, means for cutting diagonally across a section of said web dividing said section into two similar tapered strips as one of said strips is wound onto said form, and means coupled to said rotatable support for moving said cutting means transversely of said web section.

7. Apparatus for making a multilayer electrical winding having layers of insulation of graduated thickness between conductor layers, said apparatus comprising a rotatable winding mandrel, means for holding a longitudinal rectangular sheet of insulating material laterally of said mandrel, shearing means for making a tapered cut longitudinally of said sheet as a portion of said sheet cut by said shearing means is wound upon said mandrel, and adjusting means for said shearing means to automatically decrease the angle of the tapered cut as the diameter of the winding on said mandrel increases.

8. Apparatus for making a multilayer electrical winding having layers of insulation of gradually varying thickness between conductor layers, said apparatus comprising a rotatable support for a winding, a cutting device for sheet insulation to be wrapped on said support, a support for said device extending parallel with the axis of said rotatable support, means for moving said cutting device longitudinally of its support including a driving connection with said rotatable winding support.

9. Apparatus for making a multilayer electrical winding having layers of insulation of gradually varying thickness between conductor layers, said apparatus comprising a rotatable winding support, a cutting device for sheet insulation to be wrapped on said support, a support for said cutting device, means for shifting said cutting device on said last mentioned support transversely of a sheet of insulation being wrapped on said winding support including a driving connection with said rotatable winding support and a clutch means in said driving connection.

10. Apparatus for making a multilayer electrical winding having layers of insulation of gradually increasing thickness between conductor layers, said apparatus comprising a rotatable winding support, a support for a roll of sheet insulating material to be wrapped on said winding support, a device for cutting simultaneously longitudinally and transversely of a web of said roll as a portion thereof of gradually decreasing width is wrapped on said winding support, means supporting said cutting device adjacent said roll whereby the remaining cut portion of said web is left upon said roll.

11. A method for making a form wound electrical winding which comprises wrapping a first cylindrial layer of conductor turns on said form, making a pair of tapered strips of insulating material by cutting diagonally of a single longitudinal rectangular strip, wrapping one of said tapered strips into a first insulation layer of a plurality of turns over said conductor layer with the wide end of said strip adjacent said conductor layer and with one edge thereof adjacent with one end of said conductor layer, wrapping a second conductor layer over said first insulation layer and connecting an end turn thereof to an adjacent end turn of said first conductor layer at the thin end of said first insulation layer, wrapping the other of said tapered strips into a second insulation layer of a plurality of turns over said second conductor layer with the narrow end of said last mentioned strip adjacent said second conductor layer at the end of smallest diameter thereof and with one edge adjacent the corresponding end of said second conductor layer whereby the turns of said second strip will lie in substantially cylindrical surfaces, wrapping a third cylindrical conductor layer over said second insulation layer and connecting an end turn of said third conductor layer to an adjacent end turn of said second conductor layer opposite the end connected to said first conductor layer.

12. A method of making a form wound electrical winding which comprises wrapping a first flat layer of conductor turns on said form, forming a first insulation layer over said first conductor layer by securing an end of a web of insulating material onto said conductor layer and then wrapping a plurality of turns of a first tapered portion of said web thereover, said first tapered web portion being formed simultaneously with a second similar tapered portion by cutting diagonally across a section of said web as said first tapered portion is wrapped onto said first conductor layer, wrapping a second conductor layer over said first insulation layer, forming a second insulation layer over said second conductor layer by securing the narrow end of said second tapered web portion onto the narrow end of said second conductor layer and wrapping a substantially equal number of turns of said second web portion as of said first web portion over said second conductor layer, and wrapping a third flat conductor layer over said second insulation layer.

13. A method of making a form wound electrical winding comprising a plurality of conductor layers connected in series by connections between adjacent end turns, and having layers of insulation between said conductor layers of a thickness varying generally in accordance with the potential difference occurring between adjacent turns of two adjacent conductor layers, said method comprising the steps of wrapping a first flat layer of conductor turns on a form, forming over said first conductor layer a first insulation layer by feeding onto said conductor layer a plurality of turns of a first tapered strip of insulating material wide end first while rotating said form about its axis, producing said first tapered strip from a web of insulating material simultaneously with the feeding thereof onto said conductor layer by moving a cutter transversely of said web dividing said web into two similar complementary tapered strips, wrapping a second conductor layer over said first insulation layer, forming a second insulation layer over said second conductor layer by feeding the second of said two complementary tapered strips onto said second conductor layer narrow end first with one edge of said strip adjacent the narrow end of said winding, and wrapping a third conductor layer over said second insulation layer.

14. A method of making an electrical winding comprising a plurality of conductor layers connected in series by connections between adjacent end turns and having layers of insulation between said conductor layers of a thickness varying in accordance with the potential difference occurring between adjacent turns of two adjacent conductor layers said method comprising the steps of forming a pair of similar complementary tapered strips of insulating material by cutting diagonally across a length of a web of said material, wrapping said strips into said winding alternately with conductor layers by wrapping one of said strips wide end first upon a flat conductor layer with one edge thereof adjacent a first end of said winding and the other of said strips narrow end first upon the next succeeding conductor layer with one edge of said strip adjacent the second end of said winding.

15. A method of making a form wound electrical winding comprising a plurality of conductor layers connected in series by connections between adjacent end turns and having layers of insulation between said conductors of a thickness varying in accordance with the potential difference occurring between adjacent turns of two adjacent layers, said method comprising the steps of first wrapping one flat layer of conductor turns on a form, forming a pair of similar complementary tapered strips of insulating material by cutting diagonally across a length of a web of such material, forming a first insulation layer by wrapping a first of said strips onto said first conductor layer simultaneously with the cutting thereof wide end first with one edge thereof adjacent a first end of said winding, wrapping a second conductor layer over said first insulation layer, forming a second insulation layer by wrapping the second of said strips over said second conductor layer narrow end first with one edge of said strip adjacent the second end of said winding, and wrapping a second flat conductor layer over said second insulation layer.

16. The method of making a form wound electrical winding comprising a plurality of conductor layers connected in series and having layers of insulation of graduated thickness between said conductor layers, said method comprising the steps of winding a first flat layer of conductor turns on a form, wrapping a plurality of turns of web of insulating material over said layer and simultaneously cutting said web diagonally across over a length corresponding to said plurality of turns, unwrapping the upper diagonally cut portion of said web from said conductor layer, winding a second conductor layer onto said form, and wrapping said diagonally cut web portion over said second conductor layer in the same relative position as it occupied before it was unwrapped from said form.

17. A method of making a form wound electrical winding comprising a plurality of conductor layers connected in series by connections between adjacent end turns and having layers of insulation between said conductor layers of varying thickness, said method comprising the steps of wrapping a first flat layer of conductor turns on a form, forming a first layer of insulation over said first conductor layer by feeding onto said first conductor layer a predetermined number of turns of a tapered strip of insulating material while rotating said form about its axis, producing said tapered strip from a web of insulating material simultaneously with the wrapping thereof wide end first upon said conductor layer by cutting diagonally across said web for said predetermined number of turns at a rate directly proportional to the rate of rotation of said form.

18. An apparatus for making an electrical winding including means for rotatably supporting a winding form, means for holding a longitudinal web of insulating material in lateral alignment with said form, means for cutting longitudinally of said web at an angle with respect to an edge thereof as a portion of said web is wound upon said form, and means for mounting said cutting means for movement laterally of said web as a cut portion of said web is wound upon said form.

LEVIN W. FOSTER.